United States Patent
Kim et al.

(10) Patent No.: US 10,890,806 B2
(45) Date of Patent: Jan. 12, 2021

(54) TRANSMITTANCE VARIABLE FILM, MANUFACTURING METHOD AND USE THEREOF

(71) Applicant: LG Chem, Ltd., Seoul (KR)

(72) Inventors: Jung Woon Kim, Daejeon (KR); Su Young Ryu, Daejeon (KR); Byoung Kun Jeon, Daejeon (KR); Moon Soo Park, Daejeon (KR)

(73) Assignee: LG Chem, Ltd.

( * ) Notice: Subject to any disclaimer, the term of this patent is extended or adjusted under 35 U.S.C. 154(b) by 137 days.

(21) Appl. No.: 16/080,545

(22) PCT Filed: Jul. 27, 2017

(86) PCT No.: PCT/KR2017/008074
§ 371 (c)(1),
(2) Date: Aug. 28, 2018

(87) PCT Pub. No.: WO2018/021837
PCT Pub. Date: Feb. 1, 2018

(65) Prior Publication Data
US 2020/0124923 A1 Apr. 23, 2020

(30) Foreign Application Priority Data
Jul. 27, 2016 (KR) .................. 10-2016-0095158

(51) Int. Cl.
*G02F 1/1337* (2006.01)
*G02F 1/1339* (2006.01)
(Continued)

(52) U.S. Cl.
CPC ........ *G02F 1/1337* (2013.01); *G02F 1/13392* (2013.01); *B29D 11/00788* (2013.01);
(Continued)

(58) Field of Classification Search
CPC ............ G02F 1/1337; G02F 1/133753; G02F 1/1339; G02F 1/13394; G02F 1/137
See application file for complete search history.

(56) References Cited

U.S. PATENT DOCUMENTS

| 5,200,238 A | 4/1993 | McArdle et al. |
| 5,539,547 A * | 7/1996 | Ishii .................... G02F 1/13476 |
| | | 349/86 |

(Continued)

FOREIGN PATENT DOCUMENTS

| CN | 1576971 A | 2/2005 |
| CN | 101283296 A | 10/2008 |

(Continued)

OTHER PUBLICATIONS

Search Report from International Application No. PCT/KR2017/008074, dated Nov. 29, 2017.

(Continued)

*Primary Examiner* — Dung T Nguyen
(74) *Attorney, Agent, or Firm* — Lerner, David, Littenberg, Krumholz & Mentlik, LLP (57) ABSTRACT

The present application relates to a transmittance variable film, a method for producing the same, and a use thereof. The transmittance variable film of the present application can solve the drive unevenness phenomenon by adjusting the pre-tilt of the opposite alignment film of the alignment film to which the ball spacer is fixed to minimize the reverse tilt occurring upon on-off driving. The transmittance variable film of the present application can be used as sunroofs.

10 Claims, 3 Drawing Sheets

(51) Int. Cl.
*B29D 11/00* (2006.01)
*G02F 1/137* (2006.01)

(52) U.S. Cl.
CPC .... *B29D 11/00865* (2013.01); *G02F 1/13718* (2013.01); *G02F 1/13781* (2013.01); *G02F 1/133788* (2013.01); *G02F 2001/13373* (2013.01); *G02F 2001/13398* (2013.01); *G02F 2001/133746* (2013.01); *G02F 2001/133749* (2013.01)

(56) References Cited

U.S. PATENT DOCUMENTS

| | | | |
|---|---|---|---|
| 5,629,786 | A | 5/1997 | Ogura et al. |
| 7,501,163 | B2 * | 3/2009 | Kim .................. G02F 1/133711 |
| | | | 252/299.01 |
| 8,184,257 | B2 * | 5/2012 | Cho .................... G02F 1/13392 |
| | | | 349/155 |
| 2005/0007528 | A1 | 1/2005 | Sakamoto et al. |
| 2007/0064176 | A1 | 3/2007 | Kubota et al. |
| 2007/0122566 | A1 | 5/2007 | Kim |
| 2008/0106675 | A1 | 5/2008 | Uesaka et al. |
| 2009/0079916 | A1 | 3/2009 | Kim et al. |
| 2009/0128770 | A1 | 5/2009 | Niiyama et al. |
| 2011/0122362 | A1 | 5/2011 | Galstian |
| 2011/0292306 | A1 | 12/2011 | Kim et al. |
| 2013/0265289 | A1 * | 10/2013 | Chen .................. G02F 1/13718 |
| | | | 349/123 |
| 2017/0045765 | A1 | 2/2017 | Fujisawa et al. |

FOREIGN PATENT DOCUMENTS

| | | | |
|---|---|---|---|
| CN | 102150074 | A | 8/2011 |
| EP | 0387059 | A2 | 9/1990 |
| JP | H06175139 | A | 6/1994 |
| JP | H09329790 | A | 12/1997 |
| JP | 2001042349 | A | 2/2001 |
| JP | 2001100215 | A | 4/2001 |
| JP | 2003195326 | A | 7/2003 |
| JP | 2004310139 | A | 11/2004 |
| JP | 2006152247 | A | 6/2006 |
| JP | 2006195111 | A | 7/2006 |
| JP | 2008233788 | A | 10/2008 |
| JP | 2008268309 | A | 11/2008 |
| JP | 2009116167 | A | 5/2009 |
| JP | 2014211593 | A | 11/2014 |
| JP | 5761244 | B2 | 8/2015 |
| KR | 19990002057 | A | 1/1999 |
| KR | 20080099412 | A | 11/2008 |
| KR | 20110078788 | A | 7/2011 |
| KR | 101186372 | B1 | 9/2012 |
| KR | 101212142 | B1 | 12/2012 |
| TW | 200722830 | A | 6/2007 |
| TW | 201518410 | A | 5/2015 |
| TW | 201602319 | A | 1/2016 |
| WO | 2008001817 | A1 | 1/2008 |

OTHER PUBLICATIONS

Search Report from Taiwanese Office Action of TW106125205 dated Jan. 18, 2018.
Extended European Search Report including Written Opinion for EP17834778.7 dated Dec. 21, 2018.

* cited by examiner

TRANSMITTANCE VARIABLE FILM, MANUFACTURING METHOD AND USE THEREOF

CROSS-REFERENCE TO RELATED APPLICATIONS

The present application is a national phase entry under 35 U.S.C. § 371 of International Application No. PCT/KR2017/008074, filed on Jul. 27, 2017 which claims priority from Korean Patent Application No. 10-2016-0095158 filed on Jul. 27, 2016, the disclosures of which are incorporated herein by reference.

TECHNICAL FIELD

The present application relates to a transmittance variable film, a method for manufacturing the same, and a use thereof.

BACKGROUND ART

The transmittance variable film comprises a liquid crystal layer between a first substrate on which a first alignment film is formed and a second substrate on which a second alignment film is formed, and may be equipped with ball spacers as a cell gap holding member for maintaining a constant cell gap between the first substrate and the second substrate.

The ball spacer has advantages that the process is simple and the cost is inexpensive, as compared with the column spacer, but has insufficient fixing force with the first alignment film or the second alignment film, so that the ball spacer can be moved by an external force applied from the outside of the transmittance variable film. When the ball spacer moves, damage such as scratches is generated on the first alignment film or the second alignment film. Therefore, misalignment of the liquid crystal molecules on the damaged alignment film occurs. Such misalignment of the liquid crystal molecules causes light leakage defects. Accordingly, there is a need for a technique for fixing the ball spacer in the field of the transmittance variable film (Patent Document 1: Korean Laid-open Patent Publication No. 2008-0099412).

DISCLOSURE

Technical Problem

In order to fix the ball spacers and improve dispersibility, an alignment film composition comprising ball spacers may be applied to a base material in which the surface roughness is controlled. However, when the surface roughness of the base material is increased, the interface of the alignment film becomes rough to have a random pre-tilt, and a degree of inducing reverse tilt varies upon on/off driving according to the pre-tilt of the opposite alignment film. Generally, since there is almost no pre-tilt due to the nature of the alignment film, there is a problem that a drive unevenness phenomenon occurs due to the reverse tilt recognized by the naked eye.

The present application is for solving the above problem, and provides a transmittance variable film capable of solving the drive unevenness phenomenon by minimizing the reverse tilt occurring upon on-off driving, a method for manufacturing the same, and a use thereof.

Technical Solution

Figure 1:
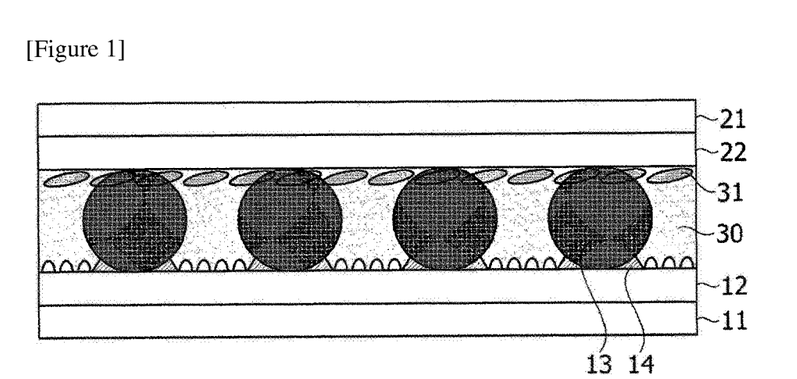
FIG. 1 shows the transmittance variable film of Example 1 of the present application.

The present application relates to a transmittance variable film. FIG. 1 illustratively shows a transmittance variable film according to one embodiment of the present application. As shown in FIG. 1, the transmittance variable film may comprise a first substrate member comprising a first electrode film (11), a first alignment film (12) formed on the first electrode film and ball spacers (13) fixed to the first alignment film; a second substrate member comprising a second electrode film (21) and a second alignment film (22) formed on the second electrode film and having a pre-tilt angle of 0.2 to 89 degrees; and a liquid crystal layer (30) formed between the first alignment film and the second alignment film.

The transmittance variable film of the present application can secure drive uniformity by adjusting the pre-tilt of the second alignment film formed on the opposite side of the first alignment film to inhibit the reverse tilt as much as possible and thus minimizing the reverse tilt domain size recognized by the naked eye.

Hereinafter, the transmittance variable film of the present application will be described in detail.

In this specification, the pre-tilt may have an angle and a direction. The pre-tilt angle may be referred to as a polar angle, and the pre-tilt direction may also be referred to as an azimuthal angle.

In this specification, the random pre-tilt may mean a pre-tilt in which the pre-tilt angle or the pre-tilt direction is not constant.

The pre-tilt angle may mean an angle that a liquid crystal director forms with respect to a horizontal surface with the alignment film. The pre-tilt direction may mean a direction that the liquid crystal director is projected on the horizontal surface of the alignment film.

The term "liquid crystal director" herein may mean a long axis when the liquid crystal has a rod shape and a normal direction axis of a disk plane when the liquid crystal has a discotic shape.

The first substrate member may comprise a first electrode film. The first electrode film may comprise a first base film and a first electrode layer sequentially.

As the first base film, for example, those having optical transparency can be used. As the first base film, an optically transparent plastic film or sheet can be used, or glass can be used. As the plastic film or sheet, a cellulose film or sheet such as a DAC (diacetyl cellulose) or TAC (triacetyl cellulose) film or sheet; a COP (cycloolefin copolymer) film or sheet such as a norbornene derivative resin film or sheet; an acrylic film or sheet such as a PMMA (poly(methyl methacrylate)) film or sheet; a PC (polycarbonate) film or sheet; an olefin film or sheet such as a PE (polyethylene) film or a PP (polypropylene) film or sheet; a PVA (polyvinyl alcohol) film or sheet; a PES (poly ether sulfone) film or sheet; a PEEK (polyetheretherketone) film or sheet; a PEI (polyetherimide) film or sheet; a PEN (polyethylenenaphthalate) film or sheet; a polyester film such as a PET (polyethyleneterephthalate) film or sheet; a PI (polyimide) film or sheet; a PSF (polysulfone) film or sheet; a PAR (polyarylate) film or sheet or a fluororesin film or sheet, and the like can be exemplified, and generally a cellulose film or sheet, a polyester film or sheet, or an acrylic film or sheet, and the like can be used, and preferably a TAC film or sheet can be used, without being limited thereto.

As the first electrode layer, a transparent conductive layer can be used. For example, as the first electrode layer, those formed by depositing a conductive polymer, a conductive metal, a conductive nanowire or a metal oxide such as ITO (Indium Tin Oxide), and the like can be used. Besides, various materials capable of forming a transparent conductive layer and formation methods are known, which can be applied without limitation.

The first substrate member may comprise a first alignment film. The first alignment film may be formed on the first electrode film. As the first alignment film, those having alignment ability with respect to the adjacent liquid crystals can be appropriately selected and used. As the first alignment film, for example, a contact type alignment film such as a rubbing alignment film or a non-contact type alignment film such as a photo-alignment film can be used. According to one embodiment of the present invention, the first alignment film may be a photo-alignment film.

The photo-alignment film may comprise a photo-alignment film material. In this specification, the alignment film material may mean a material capable of inducing alignment of the adjacent liquid crystals. In this specification, the photo-alignment film material may mean a material which shows liquid crystal alignment by light irradiation, for example, irradiation of a polarized ultraviolet ray. The photo-alignment film material may be obtained by irradiating a photo-alignment material with light to be aligned with a photo-isomerization reaction, a photodegradation reaction or a photo-dimerization reaction. The pre-tilt angle of the photo-alignment film can be adjusted according to the irradiation angle of the polarized ultraviolet ray, and the pre-tilt direction of the photo-alignment film can be formed according to the irradiation direction of the polarized ultraviolet ray. The pre-tilt angle of the photo-alignment film tends to increase as the irradiation angle of the polarized ultraviolet ray increases.

The photo-alignment film material may be at least one selected from the group consisting of, for example, polyamide, polyimide, polyvinyl alcohol, polyamic acid and polycinnamate. According to one embodiment of the present invention, polycinnamate may be used as the photo-alignment film material.

The thickness of the first alignment film can be appropriately selected in consideration of the object of the present application. For example, the first alignment film may have a thickness of 50 nm to 1000 nm.

The first substrate member may comprise ball spacers fixed to the first alignment film. In this specification, the fact that the ball spacers are fixed to the first alignment film means that the ball spacers firmly stick to the first alignment film. Specifically, in this specification, the fact that the ball spacers are fixed to the first alignment film is a different meaning from that the spacers simply contact the alignment film, which may mean a state in which the spacers are fixed to one side of the alignment film, and thus have no movement by external force or pressure. It can be confirmed whether or not the spacers are fixed to the alignment film, for example, by which alignment film the spacers remain in, when a liquid crystal cell is disassembled. As shown in FIG. 1, the lower part of the ball spacer (13) may be fixed to the first alignment film via a cured product (14) formed on the upper part of the first alignment film (12). The cured product (14) may exist in a plurality of regions on the first alignment film apart from each other. The cured product (14) may have an inclined surface on the side. The upper surface of the cured product (14) may have a concave portion corresponding to a convex portion of the lower surface of the ball spacer (13). The concave portion of the upper surface of the cured product (14) and the convex portion of the lower surface of the ball spacer may be in close contact with each other.

The cured product may comprise a curable material. As the curable material, a heat-curable material or a photo-curable material may be used. As the photo-curable material, an ultraviolet curable material may be used. As the heat-curable material, for example, a silicone resin, a silicon resin, a furan resin, a polyurethane resin, an epoxy resin, an amino resin, a phenol resin, a urea resin, a polyester resin or a melamine resin, and the like may be used. As the ultraviolet curable material, typically, an acrylic polymer, for example, a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer, and the like may be used.

According to one embodiment of the present invention, a photo-alignment material may be used as the curable material. As the photo-alignment material, polyamide, polyimide, polyvinyl alcohol, polyamic acid or polycinnamate, and the like can be used.

The upper part of the ball spacer (13) may be in contact with the second alignment film (22). The ball spacer (13) may maintain a gap, so that the liquid crystal layer (30) may be formed between the first alignment film (12) and the second alignment film (22).

The diameter of the ball spacer can be appropriately selected in consideration of the object of the present application. For example, the ball spacer may have a diameter of 2 μm to 100 μm, more specifically 8 μm to 30 μm. When the diameter of the ball spacer is in the above range, an appropriate gap may be maintained so that a liquid crystal layer may be formed between the first alignment film and the second alignment film.

The material constituting the ball spacer may be suitably selected in consideration of the object of the present application. For example, the ball spacer may comprise at least one selected from the group consisting of a carbon-based material, a metal-based material, an oxide-based material, and a composite material thereof. When the ball spacer is made of the above material, it is suitable for realizing a transmittance variable film.

The surface roughness of the first alignment film can be appropriately selected in consideration of the object of the present application. For example, the first alignment film may have a surface roughness of 3 nm to 100 nm. When the surface roughness of the first alignment film is in the above range, the dispersibility of the ball spacers fixed to the first alignment film can be secured. In FIG. 1, the protrusion portion of the first alignment film (12) surface may mean that the first alignment film has the surface roughness as above.

As described in the technical problem of the present application, when the surface roughness of the first alignment film is adjusted to secure the dispersibility of the ball spacers, the first alignment film has a random pre-tilt, and the drive unevenness phenomenon may also occur due to the reverse tilt upon on-off driving. The transmittance variable film of the present application may solve the drive unevenness phenomenon by adjusting the pre-tilt of the second alignment film to minimize the reverse tilt.

The surface roughness of the first alignment film may be adjusted by including nanoparticles in the first alignment film, by molding the first alignment film with a mold, by partially eroding the first alignment film with a partially erodible solvent or by applying physical force to the first alignment film.

According to one embodiment of the present invention, the surface roughness of the first alignment film can be adjusted by including nanoparticles in the first alignment film. In this case, the first alignment film may comprise an alignment film material and nanoparticles. According to one embodiment of the present application, the alignment film material may be a photo-alignment film material. The nanoparticles may exist in a state dispersed in the first alignment film. The nanoparticles may protrude from the surface of the alignment film material to induce the surface roughness.

In this specification, nanoparticles may mean particles having an average particle diameter in nanometers (nm), for example, particles having an average particle diameter of from 1 nm to less than 1,000 nm. According to one embodiment of the present invention, the average particle diameter of the nanoparticles may be, for example, 200 nm to 500 nm. When the average particle diameter of the nanoparticles is in the above range, the dispersibility of the ball spacers can be secured by imparting an appropriate surface roughness to the first alignment film.

As the nanoparticles, inorganic nanoparticles or organic nanoparticles can be used. For example, as the nanoparticles, organic particles such as PMMA (poly(methyl methacrylate)) can be used.

The second substrate member may comprise a second electrode film. The second electrode film may comprise a second base film and a second electrode layer sequentially. For the second base film and the second electrode layer, the contents of the first base film and the first electrode layer may be equally applied.

The second substrate member may comprise a second alignment film formed on the second electrode film and having a pre-tilt angle of 0.2 to 89 degrees. More specifically, the upper limit of the pre-tilt angle may be 20 degrees or less, 15 degrees or less, 12.5 degrees or less, 10 degrees or less, 9.5 degrees or less, 9 degrees or less, 8.5 degrees or less, 8 degrees or less, 7.5 degrees or less, 7 degrees or less, 6.5 degrees or less, 6 degrees or less, 5.5 degrees or less, 5 degrees or less, 4.5 degrees or less, 4 degrees or less, 3.5 degrees or less, 3 degrees or less, 2.5 degrees or less, 2 degrees or less, 1.5 degrees or less, 1 degree or less, or 0.5 degrees or less. More specifically, the lower limit of the pre-tilt angle may be 0.2 degrees or more, 0.25 degrees or more, 0.3 degrees or more, 0.35 degrees or more, 0.4 degrees or more, or 0.45 degrees or more. When the pre-tilt angle of the second alignment film is in the above range, the drive uniformity can be secured by inhibiting the reverse tilt as much as possible to minimize the reverse tilt domain size recognized by the naked eye.

The thickness of the second alignment film can be appropriately selected in consideration of the object of the present application. For example, the second alignment film may have a thickness of 50 nm to 1000 nm. When the thickness of the second alignment film is in the above range, it may be more advantageous to secure the drive uniformity by inhibiting the reverse tilt as much as possible to minimize the reverse tilt domain size recognized by the naked eye.

As the second alignment film, for example, a contact type alignment film such as a rubbing alignment film or a non-contact type alignment film such as a photo-alignment film can be used. According to one embodiment of the present invention, the second alignment film may be a photo-alignment film. The photo-alignment film may comprise a photo-alignment film material. The photo-alignment film material may be at least one selected from the group consisting of, for example, polyamide, polyimide, polyvinyl alcohol, polyamic acid and polycinnamate. According to one embodiment of the present invention, polycinnamate may be used as the photo-alignment film material. The second alignment film may comprise no nanoparticle. That is, the second alignment film may not have intentionally induced surface roughness, in order to secure the dispersibility of the ball spacers like the first alignment film.

The pre-tilt angle of the second alignment film can be adjusted by a known method of adjusting the pre-tilt angle of the alignment film. For example, when the second alignment film is a photo-alignment film, the pre-tilt angle can be obtained by adjusting the light irradiation angle for forming the photo-alignment film.

As shown in FIG. 1, the transmittance variable film may comprise a liquid crystal layer (30) formed between the first alignment film (12) and the second alignment film (22). The liquid crystal layer may exist in a region, where no ball spacer (13) is present, between the first alignment film and the second alignment film. The liquid crystal layer may comprise a liquid crystal compound. FIG. 1 illustratively shows an aligned state of the liquid crystal compound (31) adjacent to the second alignment film (22). The aligned state of the liquid crystal compound at the time of no voltage application can be determined according to the pre-tilt angle of the second alignment film.

The liquid crystal compound may exist in a state in which the alignment of the liquid crystal compound is switchable within the liquid crystal layer. In this specification, the alignment of being switchable may mean that the alignment direction of the liquid crystal compound can be changed by an external action such as application of a voltage. As the liquid crystal compound, for example, a smectic liquid crystal compound, a nematic liquid crystal compound or a cholesteric liquid crystal compound, and the like can be used. As the liquid crystal compound, a liquid crystal compound without any polymerizable group or crosslinkable group can be used so that the alignment is changed under an external action such as a voltage from outside.

The liquid crystal layer may further comprise an anisotropic dye. In this specification, the term "dye" may mean a material capable of intensively absorbing and/or modifying light within a visible light region, for example, a wavelength range of 400 nm to 700 nm, and the term "anisotropic dye" may mean a material capable of anisotropically absorbing light in at least some or all range of the visible light region.

As the anisotropic dye, for example, known dyes noted as having properties that can be aligned according to the alignment state of the liquid crystal can be selected and used. As the anisotropic dye, for example, a black dye can be used. Such a dye is known, for example, as an azo dye or an anthraquinone dye, but is not limited thereto.

The dichroic ratio of the anisotropic dye can be appropriately selected in consideration of the object of the present application. For example, the anisotropic dye may have a dichroic ratio of from 5 or more to 20 or less. In this specification, the term "dichroic ratio" may mean, for example, in the case of p type dyes, a value obtained by dividing absorption of polarized light parallel to the long axis direction of the dye by absorption of polarized light parallel to the direction perpendicular to the long axis direction. The anisotropic dye may have the dichroic ratio at least at some wavelengths or at any wavelength within the wavelength range of the visible light region, for example, within the wavelength range of about 380 nm to 700 nm or about 400 nm to 700 nm.

The content of the anisotropic dye in the liquid crystal layer can be appropriately selected in consideration of the object of the present application. For example, the anisotropic dye in the liquid crystal layer may have a content of from 0.1 wt % or more to 10 wt % or less. When the content of the anisotropic dye in the liquid crystal layer is in the above range, it is suitable to exhibit transmittance variable characteristics.

The transmittance variable film of the present application can adjust transmittance depending on whether or not a voltage is applied. For example, the transmittance variable film can adjust the transmittance by adjusting the alignment of the liquid crystal layer at the time of no voltage application and voltage application. The liquid crystals and the anisotropic dye can be aligned in accordance with the alignment direction.

In this specification, the horizontal alignment may mean a state in which the directors of the liquid crystal molecules are horizontally aligned with respect to the plane of the liquid crystal layer, for example, an aligned state forming 0 to 10 degrees, 0 to 5 degrees, preferably about 0 degrees.

In this specification, the vertically aligned state may mean a state in which the directors of the liquid crystal molecules are vertically aligned with regard to the plane of the liquid crystal layer, for example, an aligned state forming about 80 to 90 degrees, about 85 to 90 degrees, preferably about 90 degrees.

In one example, the first alignment film and/or the second alignment film may be a horizontal alignment film. The horizontal alignment film can induce horizontal alignment with regard to adjacent liquid crystal molecules. In one example, the liquid crystal layer may use liquid crystals having a positive dielectric anisotropy. In this case, the liquid crystal layer is in a horizontally aligned state under a state of no voltage application and can be converted into a vertically aligned state under a state of voltage application. When the liquid crystal layer is in a horizontally aligned state, the transmittance can be reduced due to light absorption of the anisotropic dye. When the liquid crystal layer is in a vertically aligned state, light absorption by the anisotropic dye is reduced, so that the transmittance can be increased.

The present application relates to a method for manufacturing the transmittance variable film. Hereinafter, while explaining the manufacturing method, the contents described in the items of the transmittance variable film may be equally applied with regard to the matters that overlap with the transmittance variable film.

The manufacturing method may comprise, in a first substrate member comprising a first electrode film, a first alignment film formed on the first electrode film and ball spacers fixed to the first alignment film and a second substrate member comprising a second electrode film and a second alignment film formed on the second electrode film and having a pre-tilt angle of 0.2 to 89 degrees, a process of forming a liquid crystal layer between the first alignment film and the second alignment film.

The first substrate member may be manufactured by forming a first alignment film on the first electrode film. When the first alignment film is formed, a process of adjusting it to have the surface roughness of about 3 nm to 100 nm may be further performed. As described above, the surface roughness of the first alignment film may be adjusted by including nanoparticles in the first alignment film, by molding the first alignment film with a mold, by partially eroding the first alignment film with a partially erodible solvent or by applying physical force to the first alignment film.

According to one embodiment of the present invention, the surface roughness of the first alignment film may be adjusted by including nanoparticles in the first alignment film. In this case, the first alignment film may be formed by coating, drying and curing a first alignment film composition comprising nanoparticles and an alignment material on the first electrode film. The curing can be performed by irradiating the composition with polarized ultraviolet rays.

As the first alignment film composition, a solution in which the nanoparticles and the alignment material, for example, a photo-alignment material are dispersed in a solvent may be used. As the solvent, an organic solvent such as cyclohexanone may be used.

To form the first alignment film, the first alignment film composition may be coated to a thickness of about 20 nm to about 1000 nm. The coated composition can be dried at a temperature of about 80° C. to 100° C. for about 1 minute to about 3 minutes. The dried composition can be irradiated with polarized ultraviolet rays having an intensity of about 50 mW/cm$^2$ to 1000 mW/cm$^2$ for about 5 seconds to 60 seconds and cured.

The ball spacers may be fixed by coating, drying and curing a ball spacer composition comprising ball spacers and a curable material on the first alignment film. The curing can be performed by irradiating the composition with polarized ultraviolet rays.

As the ball spacer composition, a solution in which the ball spacers and a curable material, for example, a photo-alignment material are dispersed in a solvent may be used. As the solvent, an organic solvent such as cyclohexanone may be used.

The ball spacer composition may be coated to a thickness of about 20 nm to 1000 nm to fix the ball spacer to the first alignment film. The coated composition can be dried at a temperature of about 80° C. to 100° C. for about 1 minute to about 3 minutes. The dried composition can be irradiated with polarized ultraviolet rays having an intensity of about 50 mW/cm$^2$ to 1000 mW/cm$^2$ for about 5 seconds to 60 seconds and cured.

The second substrate member may be manufactured by forming a second alignment film on the second electrode film. The second alignment film may be formed by coating, drying and curing a second alignment film composition comprising an alignment material on the second electrode film. The curing can be performed by irradiating the composition with polarized ultraviolet rays.

As the second alignment film composition, a solution in which an alignment material, for example, a photo-alignment material is dispersed in a solvent may be used. As the solvent, an organic solvent such as cyclohexanone may be used.

The second alignment film composition may be coated to a thickness of about 20 nm to 1000 nm. The coated composition can be dried at a temperature of about 80° C. to 100° C. for about 1 minute to about 3 minutes. The dried composition can be irradiated with polarized ultraviolet rays having an intensity of about 50 mW/cm$^2$ to 1000 mW/cm$^2$ for about 5 seconds to 60 seconds and cured. The curing of the second alignment film composition may be performed by obliquely irradiating the composition with the polarized ultraviolet ray so that the pre-tilt angle of the second alignment film is 0.2 to 89 degrees. The irradiation angle of the polarized ultraviolet ray may be, for example, 5 to 85 degrees. Specifically, the irradiation angle of the polarized ultraviolet ray may be 5 degrees or more, 10 degrees or more, 15 degrees or more, or 20 degrees or more, and may be 85 degrees or less, 80 degrees or less, 75 degrees or less, or 70 degrees or less. The irradiation angle of the polarized ultraviolet ray may be, more specifically, 15 degrees to 25 degrees, 40 degrees to 50 degrees, or 65 degrees to 75 degrees.

The formation of the liquid crystal layer between the first substrate member and the second substrate member may be performed, for example, by a method of coating a liquid crystal composition on the first alignment film of the first substrate member to form a liquid crystal layer and then laminating the second substrate member so that the second alignment film is in contact with the ball spacer. The liquid crystal composition may comprise a liquid crystal compound or an anisotropic dye as described in the transmittance variable film.

The present application relates to a use of the transmittance variable film. The transmittance variable film of the present application can be applied to all devices to which the transmittance variation can be applied. For example, the transmittance variable film of the present application can be applied to sunroofs, goggles, sunglasses or helmets, and the like to provide transmittance variable devices. As long as the transmittance variable device comprises the transmittance variable film of the present application, other parts, structures, and the like are not particularly limited, and all contents known in the art can be appropriately applied.

Effects of the Invention

The transmittance variable film of the present application can solve the drive unevenness phenomenon by adjusting the pre-tilt of the opposite alignment film of the alignment film to which the ball spacer is fixed to minimize the reverse tilt occurring upon on-off driving. The transmittance variable film of the present application can be used in sunroofs, goggles, sunglasses or helmets, and the like.

DETAILED DESCRIPTION OF THE INVENTION

Hereinafter, the present application will be described in detail with reference to the following examples, but the scope of the present application is not limited by the following examples.

Example 1

Preparation of First Alignment Film Composition 9.675 g of a solvent (cyclohexanone), 0.325 g of a photo-alignment material (5-norbornene-2-methyl-4-methoxycinnamate) and 0.01 g of nanoparticles (PMMA, SEKISUI Co., average particle diameter: 370 nm) were added to a vial of 20 ml and mixed.

Preparation of Ball Spacer Composition 9.675 g of a solvent (cyclohexanone), 0.065 g of a photo-alignment material (5-norbornene-2-methyl-4-methoxycinnamate) and 0.1 g of ball spacers (KBN-510, SEKISUI Co., particle diameter: 10 μm) were added to a vial of 20 ml and mixed.

Preparation of Second Alignment Film Composition 9.675 g of a solvent (cyclohexanone) and 0.325 g of a photo-alignment material (5-norbornene-2-methyl-4-methoxycinnamate) were added to a vial of 20 ml and mixed.

Manufacture of First Substrate Member

A nanoparticle composition was coated on the ITO layer of the first electrode film (PC/ITO film, width×length=100 mm×100 mm) using a #4 Meyer bar to a thickness of about 300 nm. The coated composition was dried at about 80° C. for about 2 minutes. The dried composition was vertically (0 degrees) irradiated with a polarized ultraviolet ray having an intensity of 200 mW/cm² for 10 seconds and cured to form a first alignment film. The ball spacer composition was coated on the first alignment film to a thickness of about 60 nm using a #10 Meyer bar. The coated composition was dried at about 100° C. for about 2 minutes. The dried composition was vertically (0 degrees) irradiated with the polarized ultraviolet ray having an intensity of about 200 mW/cm² for 10 seconds to fix the ball spacer to the first alignment film, thereby manufacturing a first substrate member.

Manufacture of Second Substrate Member

The second alignment film composition was coated on the ITO layer of the second electrode film (PC/ITO film, width×length=100 mm×100 mm) to a thickness of about 300 nm using a #4 Meyer bar. The coated composition was dried at about 80° C. for about 2 minutes. The dried composition was irradiated with the polarized ultraviolet ray having an intensity of about 200 mW/cm² at a tilt angle of about 70 degrees for about 10 seconds to manufacture a second substrate member.

Cell Lamination 1 g of liquid crystal composition (Merck, MDA-14-4145) comprising liquid crystals and an azo-based dye was applied on the first alignment film of the first substrate member, and then the second substrate member was laminated so that the second alignment film was in contact with the ball spacer, thereby manufacturing a cell.

Example 2

A liquid crystal cell was produced in the same manner as in Example 1, except that upon manufacturing the second substrate member the polarized ultraviolet ray irradiation condition was changed to a tilt angle of about 45 degrees to manufacture an alignment film.

Example 3

A liquid crystal cell was produced in the same manner as in Example 1, except that upon manufacturing the second substrate member the polarized ultraviolet ray irradiation condition was changed to a tilt angle of about 20 degrees to manufacture an alignment film.

Comparative Example 1

A cell was produced in the same manner as in Example 1, except that upon manufacturing the second substrate member the irradiation angle of the polarized ultraviolet ray for forming the second alignment film was changed to the vertical (0 degrees).

Measurement Example 1—Pre-Tilt Angle Measurement

Figure 2:
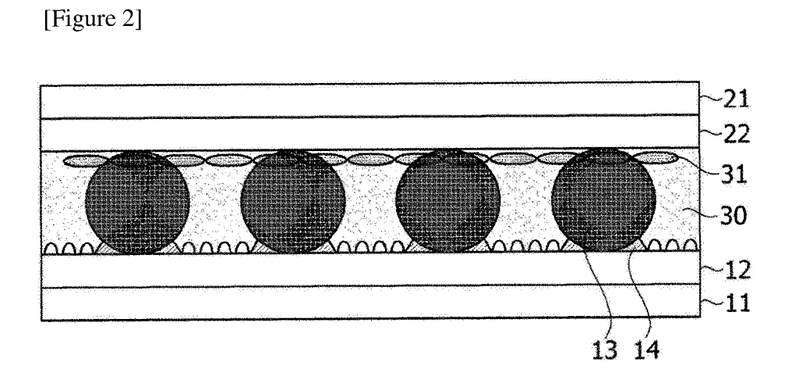
FIG. 2 shows the transmittance variable film of Comparative Example 1.
Figure 3:
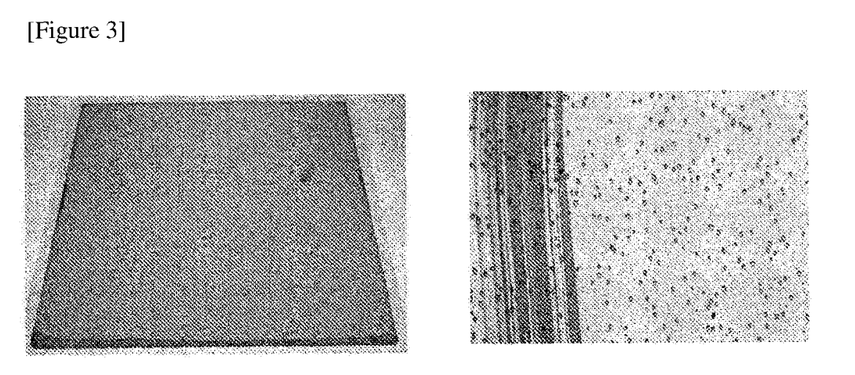
FIGS. 3 to 5 are drive images of Examples 1 to 3, respectively.
Figure 4:
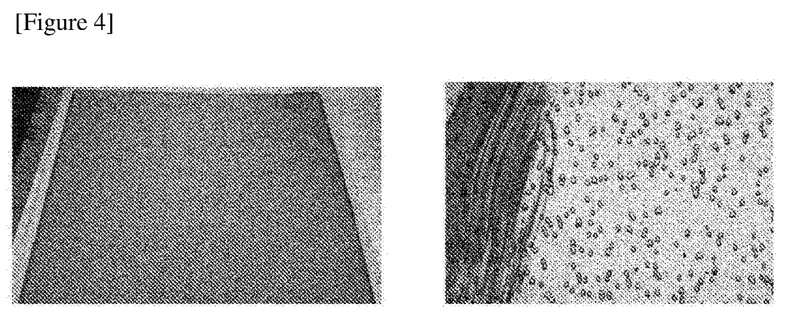
Figure 5:
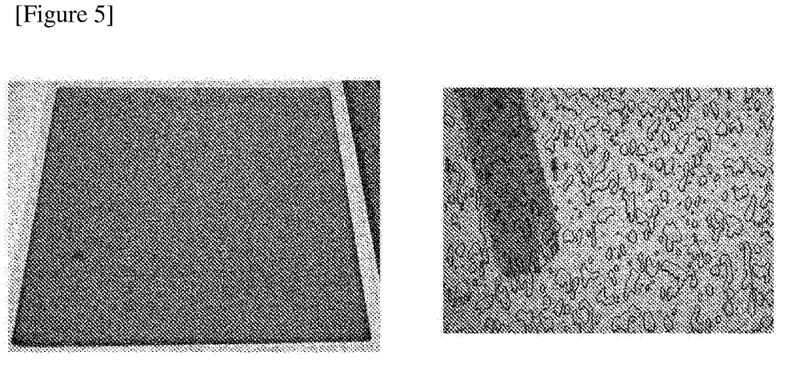

The pre-tilt angles of the second alignment films of the upper plates of Examples 1 to 3 and Comparative Example 1 were measured and the results were shown in Table 1 below. FIGS. 1 and 2 illustratively show the alignment states of liquid crystal compounds adjacent to the second alignment films of Examples 1 to 3 and Comparative Example 1, respectively. The pre-tilt angles were measured by measuring and simulating phase difference values by angle using an Axoscan (Axometics, Inc.) equipment. Specifically, isotropic base materials coated with the second alignment films were formed into an anti-parallel orientation structure to manufacture a device having a cell gap of 3 μm, and then the pre-tilt angles were measured by measuring phase differences at intervals of 0.1 degrees from 70 degrees to −70 degrees and then simulating from the molecular arrangement of the liquid crystal layer using 2×2 Jones matrix through differences in the phase differences at the same angles.

TABLE 1

|  | Pre-tilt angle (°) |
| --- | --- |
| Example 1 | 12.5 |
| Example 2 | 5.5 |
| Example 3 | 0.45 |
| Comparative Example 1 | 0.06 |

Evaluation Example 1—Domain Size Evaluation (Microscopic Observation)

For Examples 1 to 3 and Comparative Example 1, it was evaluated whether the uniform driving was performed. Specifically, it was evaluated by a method of measuring the reverse tilt domain sizes expressed by the liquid crystal at low voltage drive (3V) with a microscope.

Figure 6:
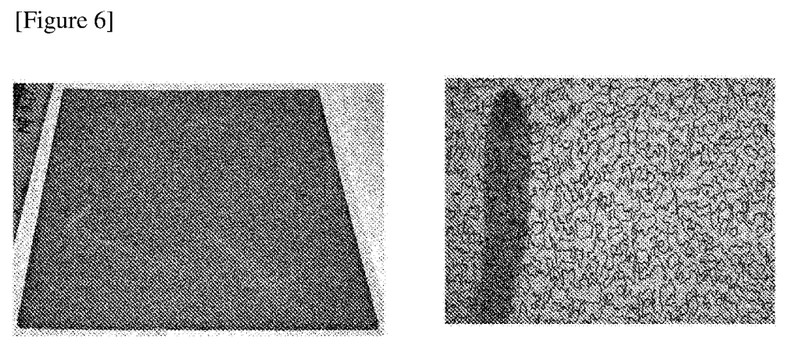
FIG. 6 is a drive image of Comparative Example 1.

FIGS. 3 to 5 and FIG. 6 are drive images of Examples 1 to 3 and Comparative Example 1, respectively. The left images in FIGS. 3 to 5 and FIG. 6 are cell photographs at 3V (AC), and the right images in FIGS. 3 to 5 and 6 are microscopic photographs (4 magnification) at 3V (AC). From FIGS. 3 to 5, Examples 1 to 3 are observed as reverse tilt domains having a size of about 10 μm to 30 μm, and from FIG. 6, Comparative Example 1 is observed as a reverse tilt domain having a size of about 200 μm to 500 μm, whereby it can be seen that Example 1 is driven uniformly over Comparative Example 1.

Evaluation Example 2—Evaluation of Electrooptical Characteristics (Hazemeter Measurement)

For Example 1 and Comparative Example 1, it was evaluated whether the uniform driving was performed. Specifically, it was evaluated for elements of Example 1 and Comparative Example 1 by a method of measuring haze values according to angles (viewing angles) using a hazemeter (NDH-5000SP) equipment, while applying a voltage.

Figure 7:
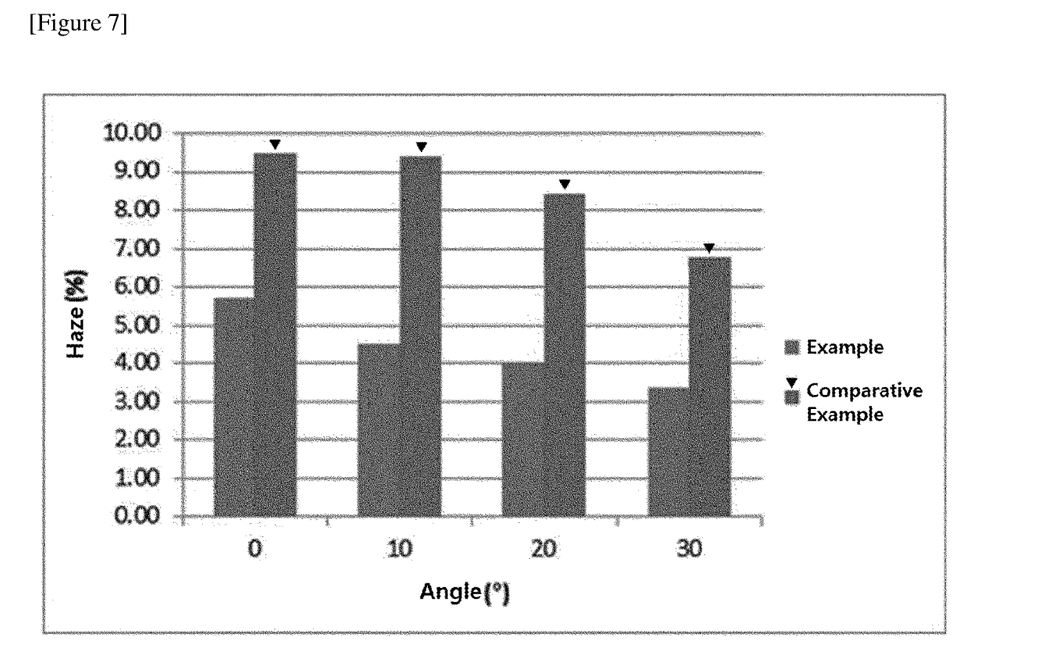
FIG. 7 shows haze values of Example 1 and Comparative Example 1 according to the angles.

FIG. 7 shows the results of measurement of haze values of Example 1 and Comparative Example 1 according to angles. As shown in FIG. 7, Example 1 exhibits 5.71% at 0 degrees, 4.50% at 10 degrees, 4.04% at 20 degrees and 3.38% at 30 degrees, and Comparative Example 1 exhibits 9.48% at 0 degrees, 9.38% at 10 degrees, 8.40% at 20 degrees and 6.79% at 30 degrees, whereby it can be confirmed that the haze values of Comparative Example 1 according to the angles are larger than those of Example 1. The results are caused by the fact that the reverse tilt domain size of Comparative Example 1 is larger than that of Example 1, from which it can be seen that Example 1 is driven more uniformly than Comparative Example 1.

EXPLANATION OF REFERENCE NUMERALS

11: first electrode film
12: first alignment film
13: ball spacer
14: cured product
21: second electrode film
22: second alignment film
30: liquid crystal layer
31: liquid crystal compound

The invention claimed is:
1. A transmittance variable film comprising
a first substrate member comprising a first electrode film, a first alignment film formed on the first electrode film, and ball spacers fixed to the first alignment film,
a second substrate member comprising a second electrode film and a second alignment film formed on the second electrode film, wherein the second alignment film has a pre-tilt angle of 0.2 to 89 degrees, and
a liquid crystal layer formed between the first alignment film and the second alignment film,
wherein the first alignment film has a surface roughness of 3 nm to 100 nm,
wherein the first alignment film comprises an alignment film material and nanoparticles, wherein the nanoparticles have an average particle diameter from 1 nm to less than 1000 nm.
2. The transmittance variable film according to claim 1, wherein a lower part of each of the ball spacers is fixed to the first alignment film via a cured product formed on an upper part of the first alignment film.
3. The transmittance variable film according to claim 1, wherein an upper part of each of the ball spacers is in contact with the second alignment film to maintain a gap, so that the liquid crystal layer can be formed between the first alignment film and the second alignment film.
4. The transmittance variable film according to claim 1, wherein each of the ball spacers has a diameter of 2 μm to 100 μm and comprises at least one selected from the group consisting of a carbon-based material, a metal-based material, an oxide-based material, and a composite material thereof.
5. The transmittance variable film according to claim 1, wherein the first alignment film has a random pre-tilt.
6. The transmittance variable film according to claim 1, wherein the liquid crystal layer comprises a smectic liquid crystal compound, a nematic liquid crystal compound, or a cholesteric liquid crystal compound.
7. The transmittance variable film according to claim 1, wherein the liquid crystal layer further comprises an anisotropic dye.
8. The transmittance variable film according to claim 1, wherein the first alignment film and the second alignment film are a photo-alignment film.
9. The transmittance variable film according to claim 1, wherein the first alignment film and the second alignment film are a horizontal alignment film, and the liquid crystal layer is in a horizontally aligned state under a state of no voltage application and is converted into a vertically aligned state under a state of voltage application.

10. A sunroof comprising the transmittance variable film of claim 1.

* * * * *